United States Patent Office 3,297,425
Patented Jan. 10, 1967

---

3,297,425
HERBICIDAL COMPOSITION
Glen D. Barbaras, Harold E. Cupery, and Donald J. Loder, Wilmington, Del., assignors to E. I. du Pont de Nemours and Company, Wilmington, Del., a corporation of Delaware
No Drawing. Filed Aug. 28, 1962, Ser. No. 220,029
1 Claim. (Cl. 71—2.6)

This application is a continuation-in-part of U.S. application Serial No. 738,964, filed June 2, 1958 which is a continuation-in-part of U.S. application Serial No. 512,274, filed May 31, 1955, both now abandoned.

This invention relates to solutions comprising a substituted urea compound, a non-aqueous polar organic solvent and a hydrogen acid having an aqueous dissociation constant of at least $1 \times 10^{-3}$.

Compounds having the following structural formula are known:

(1) 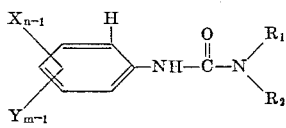

where X is hydrogen or halogen; Y is hydrogen or an aliphatic hydrocarbon group of 1 through 4 carbon atoms; $n$ is a positive whole number of less than 5; $m$ is a positive whole number of less than 4; the sum of $n$ and $m$ being 2 through 5; $R_1$ is methyl, ethyl, propyl, or butyl; and $R_2$ is hydrogen, methyl or ethyl.

Because of the extremely low solubility of most of these urea compounds in commercial solvents, there has existed a problem in obtaining solutions containing large amounts of these compounds. It has long been desired to increase the solubility of these ureas so that they can be handled conveniently in liquid form, with its attendant advantages of easy and economical storage, pumping measuring, spraying and other advantageous handling characteristics from the engineering standpoint.

We have found that solutions comprising a liquid non-aqueous polar solvent and high percentages of substituted urea compounds of Formula 1 can be prepared by including in the solution a hydrogen acid having an aqueous dissociation constant of at least $1 \times 10^{-3}$. The presence of the hydrogen acid greatly increases the solubility of the substituted ureas in polar solvents.

Hydrogen acid is used herein in its conventional sense to mean those acids containing ionizable hydrogen. Such acids can be either organic or inorganic acids. Typical of the hydrogen acids within the scope of this invention are sulfuric acid, hydrochloric acid, monochloroacetic acid dichloroacetic acid, trichloroacetic acid, 2,2 - dichloropropionic acid, 2-chloropropionic acid, phosphoric acid, phosphorous acid, sulfamic acid, fumaric acid, maleic acid, malonic acid, oxalic acid, picric acid, pyrophosphoric acid, tartaric acid, sulfurous acid, salicylic acid and phthalic acid.

Obviously, a solvent that is objectionably reactive with the particular acid or acids to be employed should not be used. The polar solvents of our novel compositions can be any of the well-known organic solvents other than water that are substantially polar in nature. Illustrative of the polar solvents, one or more of which can be used at the same time in our compositions, are chloroform, methylene chloride, ethylene dichloride, propylene dichloride, trichloroethylene 1,1,1 - trichloroethane, dichloroethylene, 1,1,2,2 - tetrachloroethylene, 1,1,2,2 - tetrachloroethane, methanol, ethanol, isopropanol, butanol, nitrobenzene, o-nitrotoluene, nitrohexane, cyclohexanone, tetrahydrofuran, diacetone alcohol, Cellosolve acetate (2-methoxy ethyl acetate), amyl alcohol, butyl acetate, isophorone, butyl Cellosolve (monobutyl ether of ethylene glycol), methyl Cellosolve (monomethyl ether of ethylene glycol), amyl acetate, 2,3-butanediol, amylene dichloride, o-dichlorobenzene, diisobutyl ketone, dipropylene glycol, and hexylene glycol.

Preferred solvents because of their high flash point and greater effect in producing solubility of the substituted ureas are chloroform, methylene chloride, trichloroethylene, 1,1,2,2-tetrachloroethylene, 1,1,2,2-tetrachloroethane, amylene dichloride and o-dichlorobenzene.

Substituted urea compounds of the type illustrated by Formula 1 above are described more fully in Todd U.S. Patents 2,655,444; 2,655,445; 2,655,446; and 2,655,447.

Illustrative of the preferred substituted urea compounds within the scope of this invention are the following:

3-(p-chlorophenyl)-1-methylurea
3-(3,4-dichlorophenyl)-1,1-dimethylurea
3-(p-chlorophenyl)-1,1-dimethylurea
3-phenyl-1,1-dimethylurea
3-(3-chloro-p-tolyl)-1,1-dimethylurea
3-(3,4-dichlorophenyl)-1,1-diethylurea
3-(p-tolyl)-1,1-dimethylurea
3-(3,4-dimethylphenyl)-1,1-dimethylurea
3-(m-chlorophenyl)-1,1-dimethylurea
3-(2,4,5-trichlorophenyl)-1,1-dimethylurea
3-(3-chloro-4-isopropylphenyl)-1,1-dimethylurea The substituted ureas can be prepared by conventional methods, as pointed out in the above-mentioned Todd patents. For example, they can be prepared by reacting a primary or secondary amine with an isocyanate or a carbamyl chloride. The following equations illustrate methods that can be used for the preparation of representative ureas:

(2) 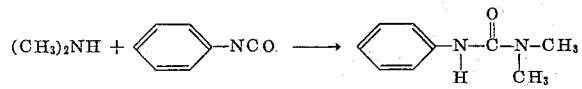

(3) 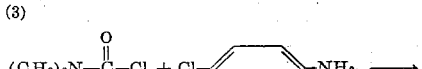

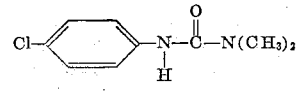

The above reactions are accomplished by bringing the reactants together, usually in chemically equivalent amounts, and, if necessary, heating to reaction temperature. Disclosure of reaction conditions for the preparation of these urea compounds, as well as their use in the control of unwanted vegetation, is more thoroughly set forth in the Todd patents.

In a related aspect, our invention includes greatly increasing the solubility of the substituted urea compounds of Formula 1 in the above described polar solvents by including in the solution a Lewis acid, such as boron fluoride (also known as boron trifluoride), aluminum chloride, zinc chloride, stannic chloride, ferric chloride, boron chloride, boron bromide, aluminum bromide, mercuric chloride, silicon tetrafluoride, boron trimethyl, boron triethyl aluminum trimethyl, aluminum triethyl and aluminum triisopropyl. Of these, boron fluoride and aluminum chloride are preferred.

It will be understood that the hydrogen acids and Lewis acids defined above are all strongly acidic electron acceptor compounds. They can generically be described as acids that are at least as strong as monochloroacetic acid. This definition can be applied to all of the acids in aqueous or organic systems, and one skilled in the art can readily determine the relative acid strengths even though there is no convenient definitive number fitting all types of acids.

Preferably, the polar solvent solutions of our invention comprising (1) polar solvent or solvents, (2) hydrogen acid or Lewis acid, and (3) substituted urea are substantially anhydrous since water adversely affects the solubility of substituted ureas in our polar solvent solutions. Of course minor amounts of water can be tolerated at a sacrifice in urea solubility.

The polar solvent solutions of our invention are prepared by combining the ingredients in any convenient manner. Thus, the substituted urea and hydrogen acid or Lewis acid can be added to the polar organic solvent either simultaneously or they can be added to the solvent one at a time. When added simultaneously, they can be in the form of a mixture or in the form of a urea-acid complex.

Preferably, the desired amount of substituted urea is added to the polar solvent, only a minor amount of the urea dissolving in the solvent. The hydrogen acid or Lewis acid is then added to the polar solvent-substituted urea mixture until all of the urea goes into the solution.

The amount of acid required to obtain a solution containing a given percentage of substituted urea depends on many factors such as the particular polar solvent, substituted urea and acid employed. Usually, the amount of acid employed ranges from about 0.1 to 2 moles of acid per mole of substituted urea, although greater amounts of acid can be used if desired.

As aforementioned, if desired, the polar solvent solution can be prepared by making an initial mixture of acid and substituted urea, which mixture is subsequently dissolved in the polar solvent. In one particular preferred example, a novel initial mixture comprising a high percentage of substituted urea dissolved in liquid anhydrous sulfuric acid can be prepared. A sufficient amount of this novel mixture is then dissolved in the polar solvent to produce a polar solvent solution comprising polar solvent, sulfuric acid, and substituted urea.

Similarly, initial mixtures of substituted urea with other liquid acid compounds, such as stannic chloride or silicon tetrachloride, or with solid acid compounds such as aluminum trichloride or trichloroacetic acid, can be prepared. Furthermore, where the acid and the substituted urea combine to form a chemical complex, a gaseous acid can be used in making the substituted urea-acid initial mixture. In one particular embodiment of this invention, our novel composition comprises a chemical complex of a substituted urea compound of Formula 1 and boron trifluoride in a ratio of about 2 moles of boron trifluoride per mole of the urea compound.

The polar solvent solutions of our invention are accurately described as true solutions rather than as dispersions or suspensions. The solutions comprising polar solvent, acid and substituted urea can be used per se as herbicidal compositions to treat a locus infested with unwanted vegetation, commonly referred to as weeds. Also, these solutions can be applied to a locus to control or prevent the subsequent infestation of the area by unwanted vegetation. In either case, application as a solution is preferred since it offers practical engineering advantages as described above.

Alternatively, the polar solvent solutions of our invention can be combined with a pest control adjuvant or carrier of the type conventionally employed, such as hydrocarbon solvents, surface-active dispersing agents and/or inert solids.

Any of the hydrocarbon solvents that are customarily included in herbicidal compositions can be used to carry or extend our polar solvent solutions. For example, compositions suitable for spray application can be prepared which comprise polar solvent solution according to our invention and a liquid such as an aromatic herbicidal oil. The use of highly aromatic hydrocarbon solvents is preferred over aliphatic hydrocarbon solvents since the former are more compatible with the polar solvent solutions.

Compositions suitable for application as dusts, granules or dispersible powders can be prepared by impregnating with our polar solvent solutions inert solid pest control adjuvants such as granular attapulgite, vermiculite, bentonite, talc, kaolin, pyrophyllite, walnut shell flour, soya bean flour, wood flour and similar conventionally employed solid carriers. If desired, the solvent can be removed by evaporation from these compositions.

Also the polar solvent solutions and the urea acid complexes can be extended with large quantities of water. Usually the compositions to be extended with water contain a surface-active dispersing agent. For example, where the polar solvent is miscible with water, preferably a suitable dispersing agent, such as methyl cellulose or sodium lignin sulfonate, is present. One convenient method for doing this is to inject a metered amount of the polar solvent solution into a stream of water just before it is sprayed from the nozzle (note water reacts with the polar solvent solution to precipitate the substituted urea). Likewise, where the polar solvent is immiscible with water, an emulsifying agent, such as a fatty acid condensation product of a polyhydric alcohol, e.g., Emcol H–50–A supplied by the Emulsol Corporation, or a condensation product of ethylene oxide with a sulfated alkyl phenol, e.g., Antarox K–430 supplied by the Antara Chemical Division of General Dyestuffs, or a polyhydric alcohol sulfonic acid derivative, e.g., Trex 80 supplied by the Griffin Chemical Company, preferably is included to give a better dispersion or emulsion.

The novel solutions of this invention have the advantages of being liquids that can be handled and used without plugging spray nozzles of utilizing equipment and without settling of ingredients out of solution. The liquids are single phase systems, with advantageous uniformity of distribution of components, in comparison with dispersions (e.g. wettable powders or emulsions) which settle out on standing.

In addition to the examples given above, the following examples are given as illustrative of the practice of the present invention:

*Example 1*

To 275 grams of reagent grade chloroform under constant agitation in a cylindrical glass trap was added 7 grams of 3-(p-chlorophenyl)-1,1-dimethylurea. Since the solubility of this urea is only about 2.3% in chloroform, only part of the substituted urea was dissolved in the chloroform. Boron trifluoride gas was then bubbled slowly into the solution for three minutes, after which time all of the urea had gone into the solution.

Additional portions of the substituted urea were then added to the chloroform solution followed by further bubbling of boron trifluoride through the solution until a total of 27.5 grams of the substituted urea had been added to and dissolved by the chloroform solution. The result was a clear, highly fluid true solution in the chloroform.

The clear solution was then put under vacuum to remove chloroform, with a pressure of less than 1 mm. of mercury ultimately being reached. During evacuation, the mixture gradually became more viscous until the final residue had the appearance of a clear dark honey and gave off no odor of chloroform or boron trifluoride.

Based on the amount of the substituted urea originally added to the chloroform and the weight of the evacuated final residue, 61% of 3-(p-chlorophenyl)-1,1-dimethylurea was present in the final residue. The calculated value for a complex containing 2 moles of boron trifluoride per mole of this urea is 59.4%, indicating that a chemical complex of these compounds in about this ratio was the final product after removal of the chloroform.

A sample of the final product was treated with distilled water with agitation for ½ hour. A fine white crystalline precipitate formed. This precipitate was filtered, washed with water and dried at 100° C. The melting point of the precipitate was 174.5 to 176° C. compared to a melting point of 174–175° C. for the starting sample of 3-(p-chlorophenyl)-1,1-dimethylurea.

The final product comprising a chemical complex of boron trifluoride and the substituted urea in a 2:1 mole ratio could not be crystallized by conventional techniques. After 27 months storage at room temperature, this complex was still a viscous liquid showing no signs of decomposition and having no odor of boron trifluoride.

A sample of the complex that had been left standing for 27 months at room temperature was treated with water, washed and dried to constant weight at 100° C. The precipitate recovered was substantially pure 3-(p-chlorophenyl)-1,1-dimethylurea and constituted 63.9% of the final residue.

*Example 2*

Recrystallized 3 - (p - chlorophenyl) - 1,1-dimethylurea crystals were spread in a thin layer on the bottom of a flat reaction tube. Boron trifluoride gas was then passed through the reaction tube over the substituted urea crystals. A partial reaction occurred, as evidenced by a change from hard free-flowing crystals to glossy particles that stuck to each other and to the glass walls of the reaction tube.

To speed up the reaction, a small amount of chloroform was added to wet the particles. Additional boron trifluoride was passed through the reaction tube over the surface of the chloroform-substituted urea mixture. The substituted urea crystals had completely disappeared in 45 minutes.

Dry air was then swept through the reaction tube until no more white fumes of boron trifluoride formed at the outlet tube of the reaction vessel. The product remaining was a clear colorless highly mobile liquid solution. Additional dry air was then swept through the tube resulting in the solution becoming more viscous although it remained clear in appearance. After 10 hours and 45 minutes, constant weight was reached.

The constant weight was equal to 98.3% of the theoretical weight for the chemical complex 3-(p-chlorophenyl) 1,1-dimethylurea·2 boron trifluoride. The substituted urea content was 60.4%, as compared to a theoretical content of 59.4% for the above product.

The resulting liquid composition, apparently a complex consisting of 2 moles of boron trifluoride per mole of 3-(p-chlorophenyl)-1,1-dimethylurea, was found to be soluble in such solvents as ethylene dichloride, tetrahydrofuran, acetone and n-butanol, with some indication of a reaction with the latter two solvents. This liquid was insoluble or only slightly soluble in hydrocarbons such as toluene or alkylated naphthalenes.

A sprayable herbicidal composition was prepared from the resultant liquid complex by dissolving 10 parts by weight of the complex into 100 parts by weight of chloroform. To this solution was added 0.14 part by weight of an emulsifying agent, which was a fatty acid condensation product of a polyhydric alcohol available under the trade name of Emcol H–50–A. The resultant solution was then mixed with 11 parts by weight of water with vigorous agitation. A smooth fluid milk-like emulsion of the polar solvent solution in water resulted. After a period of standing, no precipitation, coagulation, crystallization or breakdown of the emulsion was observed. This emulsion, when sprayed upon areas containing undesirable vegetation, is highly effective in the non-selective destruction of vegetation.

*Example 3*

A chloroform solution containing 3-phenyl-1,1-dimethylurea complexed with boron trifluoride in about a 1:2 mole ratio respectively was prepared in accordance with the procedure of Example 1 by substituting for the 3-(p-chlorophenyl)-1,1-dimethylurea of Example 1 molar equivalent amounts of 3-phenyl-1,1-dimethylurea.

This choloroform solution was subjected to evacuation to remove the chloroform. After partial evacuation, a clear highly fluid solution was obtained containing 48.4% of the substituted urea.

Further removal of chloroform left a clear viscous honey-like liquid that gave off no odor of chloroform or boron trifluoride. This liquid was soluble in acetone and slightly soluble in ether, but was not miscible with alkylated naphthalenes. Treating the honey-like liquid with dimethyl formamide or water caused the formation of a white crystalline precipitate.

A sample of the honey-like liquid was treated with water giving a precipitate, which was filtered, washed and dried at 100° C. The melting point of the precipitate was found to be 128–130° C. compared to a melting point of 132–133° C. for the starting 3-phenyl-1,1-dimethylurea.

By substituting this 3-phenyl-1,1-dimethylurea·2BF$_3$ complex for the 3 - (p - chlorophenyl) - 1,1 - dimethylurea·2BF$_3$ complex in the herbicidal formulation of Example 2 a highly effective non-selective herbicidal spray is obtained.

*Example 4*

To 19 grams of chloroform was added 1 gram of 3-(p-chlorophenyl)-1,1-dimethylurea, only part of which dissolved in the chloroform. A second suspension-solution containing 0.62 gram of reagent grade sublimed aluminum chloride and 11 grams of chloroform were then added to the first solution. After a few minutes practically no undissolved material remained in the resultant mixture.

Additional portions of the substituted urea and aluminum chloride were then added to the chloroform solution. Each such addition was completely dissolved within a few minutes. The final solution was clear in appearance and contained 28% of the substituted urea, 9% of aluminum chloride and 63% of chloroform. The molar ratio of the substituted urea to the aluminum chloride was about 2:1.

A portion of this solution was then mixed with an emulsifier, which was a blend of partially sulfonated alkyl aryl acyl derivatives available under the trade name Emcol H–50–A, the final solution containing 25% of the substituted urea and 10% of the emulsifier. Five parts by weight of this final solution were mixed with 42 parts by weight of water with vigorous agitation to form a creamy emulsion. This emulsion, when sprayed upon areas containing undesirable vegetation, is highly effective for the non-selective destruction of the vegetation.

*Example 5*

A solution containing 23.1% of 3-(p-chlorophenyl)-1,1-dimethylurea, 19.2% of trichloroacetic acid, and 57.7% of chloroform was prepared substantially in accordance with the procedure of Example 4 by substituting in place of the aluminum chloride of Example 4 appropriate amounts of trichloroacetic acid. The substituted urea to acid compound molar ratio of this solution was about 1:1.

*Example 6*

A solution containing 28.4% of 3-(p-chlorophenyl)-1,1-dimethylurea, 18.4% of dichloroacetic acid, and 51.5% of chloroform was prepared substantially in accordance with the procedure of Example 4 by substituting for the aluminum chloride of Example 4 appropriate amounts of dichloroacetic acid. It was noted during the preparation of the solution that the substituted urea did not dissolve completely until approximately an equimolar quantity of the acid compound had been added, whereupon a clear solution resulted. The molar ratio of the substituted urea to dichloroacetic acid in the final solution was approximately 1:1.

Example 7

A clear solution containing 31.2% of 3-(p-chlorophenyl)-1,1-dimethylurea, 30% of monochloracetic acid and 38.8% of chloroform was prepared substantially in accordance with the procedure of Example 4 by substituting for the aluminum chloride of Example 4 appropriate quantities of monochloroacetic acid. The molar ratio of the substituted urea to monochloroacetic acid of this solution was about 1:2.

Example 8

By following substantially the procedure of Example 1, except substituting dry hydrochloric acid gas for the boron trifluoride gas of Example 1, a solution containing 100 parts of 3-(p-chlorophenyl)-1,1-dimethylurea per 100 parts of chloroform was prepared. Note that the normal solubility of this substituted urea in chloroform is about 2.3%. This solution was clear and highly mobile.

Example 9

A clear solution comprising 5.9% of zinc chloride, 8.7% 3-(p-chlorophenyl)-1,1-dimethylurea and 85.4% of methanol was prepared by adding increments of the zinc chloride and substituted urea followed by agitation of the mixture until no undissolved material remains. After several such additions, there was obtained a final clear solution containing 10 parts by weight of the substituted urea per 100 parts by weight of methanol, as compared to a normal solubility of this compound in methanol of about 2.3% by weight.

Example 10

A clear solution containing 8.8% of 3-(p-chlorophenyl) 1,1-dimethylurea, 24% of stannic chloride, and 67.2% of methanol was prepared substantially in accordance with the procedure of Example 9 by substituting for the zinc chloride of Example 9 appropriate amounts of stannic chloride. After standing for 27 months at room temperature, this solution remained clear and showed no signs of crystal formation.

Example 11

A clear solution containing 18.2% of 3-(p-chlorophenyl) - 1,1 - dimethylurea, 8.8% of stannic chloride, and 73% of chloroform was prepared in accordance with the procedure of Example 10 by substituting for the methanol of Example 10 appropriate amounts of chloroform. The mole ratio of the substituted urea to stannic chloride was 2.7:1.

Example 12

A clear solution containing 30% of 3-(p-chlorophenyl)-1,1-dimethylurea, 27% of sulfuric acid and 43% of methanol was prepared by adding several increments of sulfuric acid and substituted urea to the methanol followed by agitation after each addition until no undissolved material remained. This product was a clear solution.

It was noted during the addition of the substituted urea and sulfuric acid to the methanol that the increments of substituted urea added did not dissolve completely until there was present almost twice the molar quantity of sulfuric acid. This condition prevailed up to a composition containing 16.7% of the substituted urea, 16.7% of sulfuric acid and 33.4% of methanol.

Example 13

A clear solution containing 80 parts by weight of 3-(p-chlorophenyl)-1,1-dimethylurea and 100 parts by weight of anhydrous sulfuric acid, a 47.3% substituted urea concentration, was prepared by dissolving the substituted urea directly in the concentrated sulfuric acid. This sulfuric acid-substituted urea mixture can be diluted with any desired amount of polar solvent to either extremely dilute or extremely concentrated herbicidally active polar solvent solutions.

Alternatively, this sulfuric acid-substituted urea mixture can be used per se for application to an area containing undesired vegetation producing highly effective non-selective killing of the vegetation in the treated area. It is also suitable for application to an area to prevent the future growth of vegetation.

Example 14

To 32 grams of chloroform is added 1 gram of 3-(3,4-dichlorophenyl)-1,1-dimethylurea, only part of which dissolves in the chloroform at 30° C. or even after heating to 60° C.

A second 1 gram portion of 3-(3,4-dichlorophenyl)-1,1-dimethylurea is added to 3.16 grams of chloroform containing 0.84 gram of trichloroacetic acid. All solids dissolved to give 5 grams of a clear solution at 30° C. Thus, the non-aqueous polar solvent alone dissolved less than 3% by weight of the substituted urea, but when a strong hydrogen acid was given to the system in a molar ratio of 1.2 times the number of moles of substituted urea, the substituted urea was soluble at more than 20% by weight in the solvent plus acid mixture.

Examples 15–17

The following acids are substituted one at a time for the trichloroacetic acid of Example 14 in like amount by weight and in like manner. Like results are obtained. Examples:
15. Dichloroacetic acid
16. 2-chloropropionic acid
17. 2,2-dichloropropionic acid

Example 18

A solution containing 20% of 3-(3,4-dichlorophenyl)-1,1-dimethylurea, 16.8% of trichloroacetic acid and 63.2% of methylene chloride is prepared substantially in accordance with the procedure of Example 14 by substituting in place of the chloroform of Example 14 like amounts by weight of methylene chloride. The substituted urea to acid compound molar ratio of this solution is about 1:1.2.

The solubility of the substituted urea in methylene chloride without the acid present is found to be less than 3% at 30° C.

Example 19

A solution containing 25% of 3-(phenyl)-1,1-dimethylurea, 25% of trichloroacetic acid and 50% of trichloroethylene is prepared substantially in accordance with the procedure of Example 14 by substituting like amounts by weight of 3 - (phenyl) - 1,1 - dimethylurea for the 3 - (3, 4-dichlorophenyl)-1,1-dimethylurea and like amount by weight of trichloroethylene for the chloroform. The substituted urea to acid compound molar ratio at this solution is about 1:1.

The solubility of the substituted urea in trichloroethylene without the acid present is found to be less than 3% at 30° C. while the 25% substituted urea composition also containing the strong acid is completely soluble at 30° C.

Example 20

A solution containing 15% of 3-(3,4-dichlorophenyl)-1,1-dimethylurea, 12.5% trichloroacetic acid and 72.5% 1,1,2,2-tetrachloroethane is prepared substantially in accordance with the procedure of Example 14 by substituting in the place of the chloroform of Example 14 like amount by weight of 1,1,2,2-tetrachloroethane. The substituted urea to acid compound molar ratio of this solution is about 1:1.2. The solution formed is clear and stable at 25° C. indicating a good solubility.

The solubility of 3-(3,4-dichlorophenyl)-1,1-dimethylurea in 1,1,2,2-tetrachloroethane above is found to be less than 3% by weight at 30° C. and at 90° C.

Examples 21–22

The following acids are substituted one at a time in like amount by weight and in like manner for the trichloroacetic acid of Example 20. Like results are obtained.

Examples:
21. 2-chloropropionic acid
22. Dichloroacetic acid

Examples 23–24

The following solvents are substituted one at a time in like amount by weight and in like manner for the trichloroethylene of Example 19. Like results are obtained.

Examples:
23. 1,1,2,2-tetrachloroethane
24. 1,1,2,2-tetracholorethylene

Example 25

A solution containing 15% of 3-(3,4-dichlorophenyl)-1,1-dimethylurea, 12.5% of trichloroacetic acid and 72.5% of amylene dichlororide is prepared in accordance with the procedure of Example 14 by substituting in the place of the chloroform of Example 14 a like amount by weight of amylene dichloride. The substituted urea to acid compound of this solution is about 1:1.2.

The solubility of the substituted urea is found to be less than 3% in amylene dichloride at 30° C. in the absence of the strong acid.

Examples 26–28

The following acids are substituted one at a time in like amount by weight and in like manner for the trichloroacetic acid of Example 25. Like results are obtained.

Examples:
26. Oxalic acid
27. 2-chloropropionic acid
28. 2,2-dichloropropionic acid

Example 29

A solution containing 15% of 3-(3,4-dichlorophenyl)-1,1-dimethylurea, 12.5% of trichloroacetic acid, 72.5% of o-dichlorobenzene is prepared substantially in accordance with the procedure of Example 14 by substituting a like amount by weight of o-dichlorobenzene. The substituted urea to acid compound ratio of this solution is about 1:1.2.

The solubility of the substituted urea is found to be less than 3% in o-dichlorobenzene at 30° C. in the absence of the strong acid.

Examples 30–32

The following acids are substituted one at a time in like amount by weight and in like manner for the trichloroacetic acid of Example 29. Like results are obtained.

Examples:
30. Salicylic acid
31. Picric acid
32. Phthalic acid

In place of the substituted ureas employed in the above examples, the other preferred substituted ureas, and particularly 3-(3,4-dichlorophenyl)-1,1-dimethylurea and 3-(p-chlorophenyl)-1-methylurea, can be used in preparing in accordance with the procedures of these examples polar solvent solutions and acid-urea compositions.

We claim:

A herbicidal composition comprising a solution of (1) a polar solvent selected from the group consisting of chloroform, methylene chloride, trichloroethylene, 1,1,2,2-tetrachloroethylene, 1,1,2,2 - tetrachloroethane, amylene dichloride, and o-dichlorobenzene and (2) a herbicidally effective amount of a chemical complex of an acid selected from the group consisting of sulfuric acid, hydrochloric acid, monochloroacetic acid, dichloroacetic acid, trichloroacetic acid, boron fluoride, and aluminum chloride, and a substituted urea compound from the group having the formula:

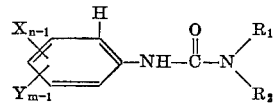

wherein:

X is selected from the group consisting of hydrogen and halogen;

Y is selected from the group consisting of hydrogen, alkyl of 1 to 4 carbon atoms, and alkenyl of 1 to 4 carbon atoms;

$n$ is a positive integer of less than 5;

$m$ is a positive integer of less than 4;

the sum of $m$ and $n$ is 2 through 5;

$R_1$ is a hydrocarbon radical of 1 through 4 carbon atoms; and $R_2$ is selected from the group consisting of hydrogen, methyl and ethyl.

References Cited by the Examiner
UNITED STATES PATENTS

| | | | |
|---|---|---|---|
| 2,655,444 | 10/1953 | Tood | 71—2.6 |
| 2,655,447 | 10/1953 | Todd | 71—2.6 |
| 2,676,955 | 4/1954 | Weitkamp et al. | 260—96.5 |
| 2,709,648 | 5/1955 | Ryker et al. | 71—2.6 |
| 2,782,112 | 2/1957 | Gilbert et al. | 71—2.6 |
| 2,801,911 | 8/1957 | Gilbert et al. | 71—2.6 |
| 3,001,861 | 9/1961 | Fischer et al. | 71—2.6 |
| 3,089,765 | 5/1963 | Gerjowich et al. | 71—2.6 |
| 3,095,407 | 6/1963 | Brust | 260—96.5 |

LEWIS GOTTS, *Primary Examiner.*

JAMES O. THOMAS, *Examiner.*